(12) United States Patent
Massis et al.

(10) Patent No.: US 11,179,906 B2
(45) Date of Patent: Nov. 23, 2021

(54) SET OF MOLDING ELEMENTS FOR TIRE MOLD

(71) Applicant: COMPAGNIE GENERALE DES ETABLISSEMENTS MICHELIN, Clermont-Ferrand (FR)

(72) Inventors: Frédéric Massis, Clermont-Ferrand (FR); Laurent Nadreau, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 0 days.

(21) Appl. No.: 16/489,154

(22) PCT Filed: Feb. 15, 2018

(86) PCT No.: PCT/FR2018/050360
§ 371 (c)(1),
(2) Date: Aug. 27, 2019

(87) PCT Pub. No.: WO2018/158519
PCT Pub. Date: Sep. 7, 2018

(65) Prior Publication Data
US 2019/0389164 A1 Dec. 26, 2019

(30) Foreign Application Priority Data
Feb. 28, 2017 (FR) ...................................... 1770199

(51) Int. Cl.
*B29D 30/06* (2006.01)
(52) U.S. Cl.
CPC .. *B29D 30/0606* (2013.01); *B29D 2030/0613* (2013.01)

(58) Field of Classification Search
CPC ........ B29D 30/0606; B29D 2030/0613; B29C 33/3842
See application file for complete search history.

(56) References Cited

U.S. PATENT DOCUMENTS 3,570,571 A 3/1971 Riches
6,408,911 B1* 6/2002 Tanabe ............... B29D 30/0606
152/209.5
(Continued)

FOREIGN PATENT DOCUMENTS

CN 104389869 A 3/2015
FR 2939712 A1 6/2010
(Continued)

OTHER PUBLICATIONS

International Search Report dated Apr. 10, 2018, in corresponding PCT/FR2018/050360 (6 pages).

*Primary Examiner* — James P Mackey
(74) *Attorney, Agent, or Firm* — Venable LLP

(57) ABSTRACT

A set of molding elements suitable for being inserted into a mold for molding a tire comprises a main strip (1) and at least one secondary strip (2), the secondary strip (2) comprising a first secondary strip portion (3) and a second secondary strip portion (4), the second secondary strip portion (4) extending the first secondary strip portion and the first (3) and second (4) secondary strip portions extending on either side of the main strip (1) and the set of molding elements comprising members to assemble the secondary strip (2) with the main strip (1).

11 Claims, 2 Drawing Sheets

(56) References Cited

U.S. PATENT DOCUMENTS

| | | |
|---|---|---|
| 8,276,629 B2 | 10/2012 | Bonhomme |
| 8,449,278 B2 | 5/2013 | Dusseaux et al. |
| 10,315,339 B2 | 6/2019 | Jenkins et al. |
| 2006/0113451 A1 | 6/2006 | Kilwin et al. |
| 2010/0078107 A1 | 4/2010 | Bonhomme |
| 2011/0180191 A1* | 7/2011 | Christenbury .......... B60C 11/12 152/209.18 |
| 2011/0304082 A1 | 12/2011 | Dusseaux et al. |
| 2018/0147748 A1 | 5/2018 | Jenkins et al. |
| 2018/0162016 A1* | 6/2018 | Reeb ................... B29C 33/3842 |

FOREIGN PATENT DOCUMENTS

| | | |
|---|---|---|
| GB | 2 434 187 A | 7/2007 |
| JP | 3-90317 A | 4/1991 |
| JP | 11-58386 A | 3/1999 |
| WO | 2008/068216 A1 | 6/2008 |
| WO | 2016/200392 A1 | 12/2016 |
| WO | WO 2016/200392 * | 12/2016 |

\* cited by examiner

SET OF MOLDING ELEMENTS FOR TIRE MOLD

TECHNICAL FIELD OF THE INVENTION

The present invention relates to a moulding element for moulding an indentation in a tread of a tyre. The invention also relates to a set of moulding elements forming a network of moulding elements in a mould.

PRIOR ART

FR2939712 discloses a set of moulding elements forming a network. The moulding elements, here ribs or strips, are integrally formed by laser sintering. These moulding elements make it possible to mould indentations in a tread of a tyre.

The network formed by the moulding elements can be large. In some manufacturing conditions, this network can be subject to considerable deformations, which puts it outside acceptable manufacturing limits. In addition, to manufacture such a network, a suitable laser sintering machine must be provided, and more particularly a platform for receiving the large network, which increases the manufacturing costs. Furthermore, when a moulding element of the network is non-compliant, the entire network must be scrapped.

WO2016/200392 describes a set of moulding elements suitable for being inserted into a tyre mould, the set comprising longitudinal and transverse strips, the latter being secured on either side of the longitudinal strips by insertion into flanges provided in the bottom zone of the longitudinal strips. Such an architecture enables the assembly of the transverse strips when the longitudinal strips are provided with the flanges. However, such flanges have a decisive impact on the shape and operation of the indentations in the tread of the tyre. If such a flange is not desired, it then becomes impossible to secure the transverse strips.

A need therefore exists for a solution that makes it possible to obtain a set of moulding elements with satisfactory mechanical performance, but without affecting the arrangements of the strips to be obtained on the tread of the tyres to be moulded.

Definitions

"Tyre" is given to mean all types of elastic tyre, subject to internal pressure or otherwise.

"Tread" of a tyre is given to mean a quantity of rubber material delimited by lateral surfaces and by two main surfaces one of which is intended for coming into contact with a carriageway when the tyre rolls and the other of which is oriented towards the inside of the tyre.

"Indentation in a tread" is given to mean either a narrow indentation, also called an incision, or a wide indentation, also called a groove.

"Moulding element" is given to mean an element arranged in a mould suitable for producing indentations in the tread of a tyre. A moulding element suitable for producing an incision in the tread is called a strip. A moulding element suitable for producing a groove in the tread is called a rib.

"Anchor zone of a moulding element" is given to mean the portion of the set of moulding elements that is located inserted in the mass of the mould when the mould is implemented.

"Moulding zone of a moulding element" is given to mean the portion of the moulding element that is located outside the mass of the mould when the mould is implemented, and serving to mould the indentations in the tread of the tyre.

SUMMARY OF THE INVENTION

The invention relates to a moulding element for moulding an indentation in a tread of a tyre. The moulding element comprises assembly means, these assembly means being suitable for connecting this moulding element to another moulding element to form a set of moulding elements.

The invention provides for a set of moulding elements suitable for being inserted into a mould for moulding a tyre, said set comprising a main strip and at least one secondary strip, said secondary strip comprising a first secondary strip portion and a second secondary strip portion, said first and second secondary strip portions extending on either side of the main strip and said set of moulding elements comprising means of assembling the secondary strip with the main strip, the assembly means consisting of either a protuberance arranged on the main strip, capable of being inserted into an opening provided to this end in the secondary strip, or of at least one anchor lug arranged on the main strip, capable of engaging with a notch in the secondary strip.

The set of moulding elements is intended for being attached in a mould. Such an architecture makes it possible to form an assembly of strips without protrusions interfering with the moulding space and capable of affecting the shape of the tread design of the moulded tyre. The assembly obtained is transparent and has no impact on the definition of the tread designs. The assembly means facilitate the production of pre-assemblies before positioning in a mould. The resulting assemblies do not affect the shape of the tread design of the tyre and give numerous options for positioning the strips opposite each other regardless of the shape of the main strip.

The fact that the moulding elements fit into each other makes it possible to guarantee the satisfactory mechanical performance thereof during the curing of the tyre. In addition, the set of moulding elements comprising different moulding elements fitted into each other in this way is more robust. Furthermore, the different moulding elements can still be produced by laser sintering, which makes it possible to obtain very complex moulding element shapes. It is to be noted that the set of moulding elements comprising the assembled elements can be directly secured in a mould, for example, by gluing. In a variant, the moulding elements of the set of moulding elements can be "embedded" together in aluminium, prior to the positioning of the set of moulding elements in the mould.

Advantageously, the second secondary strip portion extends the first secondary strip portion.

According to an advantageous embodiment, the secondary strip comprises an intermediate portion between the first and second secondary strip portions.

According to another advantageous embodiment, the intermediate portion is substantially aligned with the main strip.

Advantageously, the height of the protuberance is less than 25% of the height of the main strip, and preferably less than 15% of this height.

According to an advantageous variant, the height of the opening corresponds to the height of the protuberance.

The protuberance advantageously comprises an outer lip. This variant embodiment enables improved stiffness of the set after assembly.

Advantageously, the height of the anchor lug is at least equal to 30% of the height of the main strip.

Also advantageously, the width of the anchor lug and the width of the notch are substantially identical.

According to an advantageous embodiment, the assembly means provide at least two anchor lugs at each end on the edge of the main strip. This embodiment enables a rigid assembly both on the base and on the top zone of the strip.

According to a variant embodiment, the anchor lugs are different heights.

According to an advantageous embodiment, the assembly means are contained within the outline of the main strip and the secondary strip.

Advantageously, the means of assembling the secondary strip with the main strip are integrally formed with their respective strips.

According to a further advantageous embodiment, the first secondary strip portion and the second secondary strip portion form an angle α other than 180°.

The first secondary strip portion and the second secondary strip portion advantageously form a single strip.

BRIEF DESCRIPTION OF THE FIGURES

All of the embodiment details are given in the following description, supplemented by FIGS. 1 to 7, given solely as non-limitative examples, in which.

DETAILED DESCRIPTION OF THE INVENTION

In the description below, substantially identical or similar elements are denoted by the same reference signs.

Figure 1:
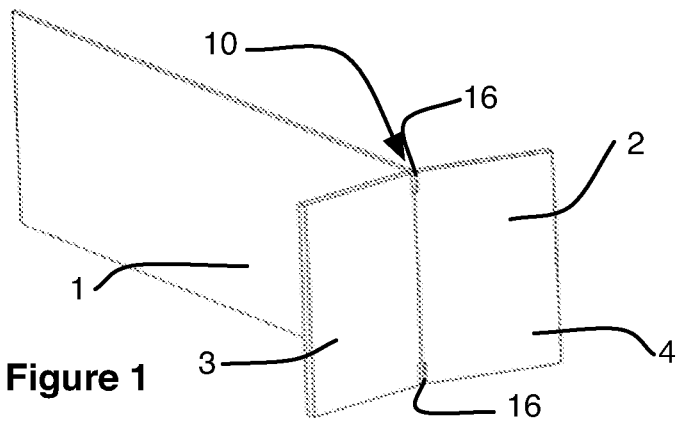
FIG. 1 is a perspective view of another example of an assembled set of moulding elements.
Figure 2:
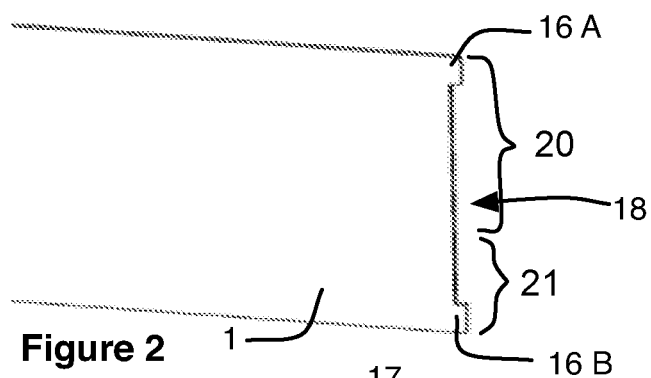
FIGS. 2 and 3 are perspective views of the example in FIG. 4 with the main strip and the secondary strip unassembled.
Figure 3:
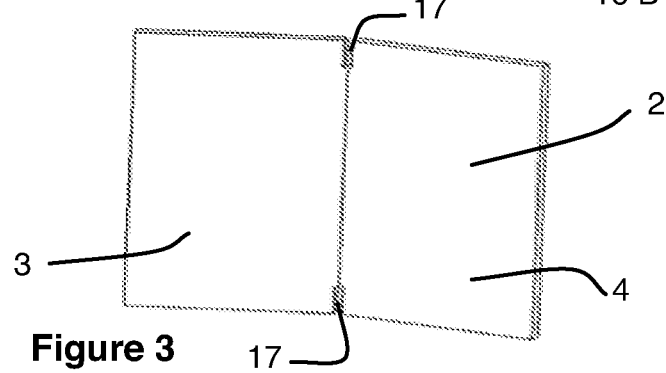

FIGS. 1 to 3 show a first embodiment of a set of moulding elements suitable for being inserted into a mould for moulding a tyre. At the time of moulding, the moulding elements make it possible to perform the moulding of indentations in a tread of a tyre.

As shown, the set comprises a main strip 1 and at least one secondary strip 2, for example mounted opposite each other with interposition of the main strip.

The secondary strip 2 is provided in two portions, namely a first secondary strip portion 3 and a second secondary strip portion 4, these two portions extending from each other. The secondary strip is secured to the main strip by assembly means 10 that can take various forms as appropriate.

In the embodiment in FIGS. 1 to 4, the assembly means consist of at least one anchor lug 16 on the main strip and a notch 17 in the secondary strip. In the embodiment shown, two anchor lugs 16 are provided, namely one at each end on the edge 18 of the main strip.

Different variants can be envisaged for the positioning of the corresponding elements lug 16 and notch 17. Among the variants envisaged, provision is made for anchor lugs with different heights.

Preferably, the height of the anchor lug 16 is at least equal to 30% of the height of the main strip. The width of the anchor lug 16 is smaller than the width of the notch 17 in order to facilitate assembly. In a variant, the widths thereof are substantially identical.

Figure 4:
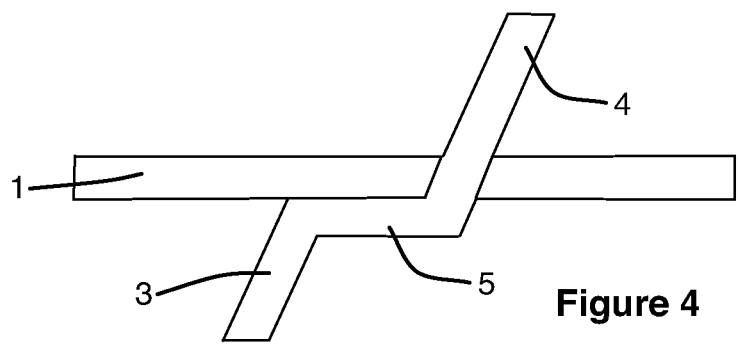
FIG. 4 is a top view of another example of an assembled set of moulding elements, in which the secondary strip comprises an intermediate portion.

In the embodiment in FIG. 4, the secondary strip comprises an intermediate portion 5 between the first and second secondary strip portions. The intermediate portion 5 is arranged so that it runs along the main strip. Such an arrangement makes it possible, for example, to slightly offset the two portions of the secondary strip.

Figure 5:
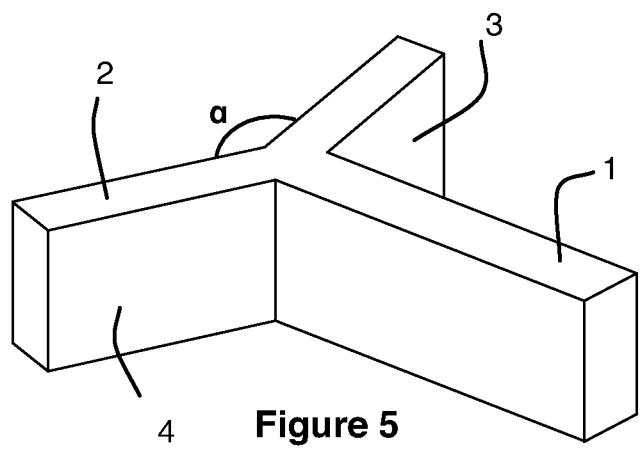
FIG. 5 is a perspective view of another example of an assembled set of moulding elements.
Figure 6:
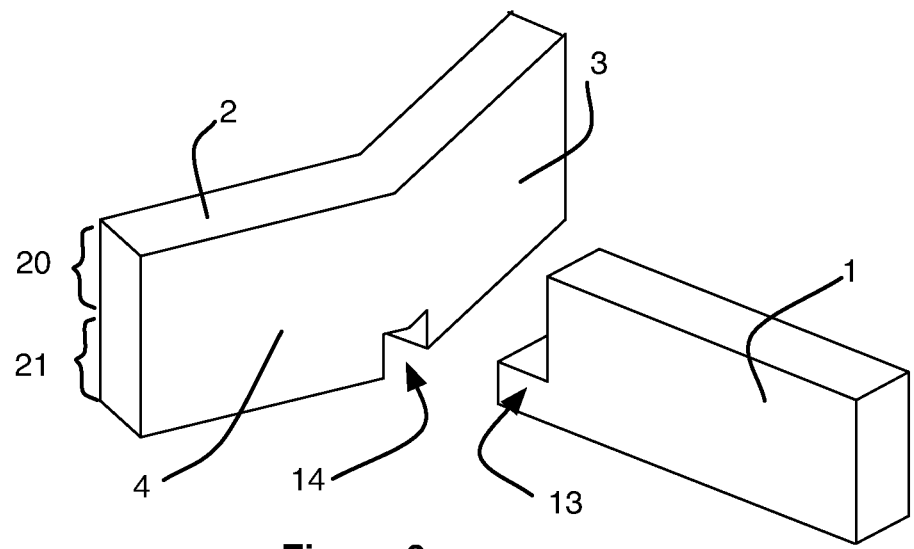
FIG. 6 is a perspective view of the example in FIG. 5 with the main strip and the secondary strip unassembled.
Figure 7:
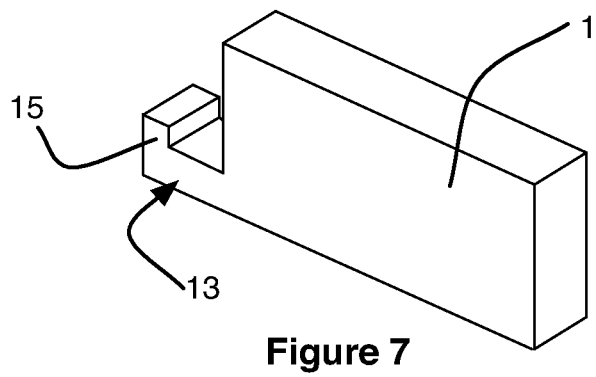
FIG. 7 is a perspective view of a variant embodiment of a main strip.

In the embodiment in FIGS. 5 to 7, the assembly means consist of a protuberance 13 on the main strip and an opening 14 at the base of the secondary strip. The height of the opening corresponds to the height of the protuberance. Furthermore, the height of the protuberance is less than 25% of the height of the main strip, and preferably less than 15% than this height.

Different variants can be envisaged for the positioning of the corresponding elements protuberance 13 and opening 14. Among the variants envisaged, the protuberance comprises an outer lip 15. This variant embodiment is shown in FIG. 10.

As can be seen in the figures showing the various embodiments of the invention, the assembly means are designed so that they are contained within the outline of the main strip and the secondary strip, i.e. these means do not protrude from this outline and do not therefore interfere with the moulding zones, for example by creating additional thicknesses on the strips, thus reducing the profiles of the tread designs of the tread.

The moulding elements are manufactured by laser sintering. In a variant, these moulding elements are manufactured by any other manufacturing method, such as casting, machining, or the like.

REFERENCE SIGNS USED IN THE FIGURES

1 Main strip
2 Secondary strip
3 First secondary strip portion
4 Second secondary strip portion
5 Intermediate portion
10 Assembly means
13 Protuberance
14 Opening
15 Outer lip
16 Anchor lug
17 Notch
18 Edge
20 Moulding zone
21 Anchor zone

The invention claimed is:

1. A set of molding elements suitable for being inserted into a mold for molding a tire, the set comprising:
   a main strip;
   at least one secondary strip, the secondary strip comprising a first secondary strip portion and a second secondary strip portion, the first and second secondary strip portions extending on either side of the main strip; and
   an assembly means configured to assemble the at least one secondary strip with the main strip, wherein the assembly means consists of a member, arranged on the main strip, the member comprising at least one anchor lug, capable of engaging with a notch in the at least one secondary strip, and wherein an anchor lug is provided at each end on an edge of the main strip and the notch is provided on a side of the secondary strip, thereby providing a pre-assembly at an extremity of the main strip along the edge.

2. The set of molding elements according to claim 1, wherein the second secondary strip portion extends the first secondary strip portion.

3. The set of molding elements according to claim 1, wherein the at least one secondary strip comprises an intermediate portion between the first and second secondary strip portions.

4. The set of molding elements according to claim 3, wherein the intermediate portion is substantially aligned with the main strip.

5. The set of molding elements according to claim 1, wherein the at least one anchor lug has a height equal to at least 30% of a height of the main strip.

6. The set of molding elements according to claim 1, wherein a width of the at least one anchor lug and a width of the notch are substantially identical.

7. The set of molding elements according to claim 1, wherein each anchor lug has a different height.

8. The set of molding elements according to claim 1, wherein the assembly means is contained within an outline of the main strip and the at least one secondary strip.

9. The set of molding elements according to claim 1, wherein the assembly means is integrally formed with the main strip and the at least one secondary strip.

10. The set of molding elements according to claim 1, wherein the first secondary strip portion and the second secondary strip portion form an angle $\alpha$ other than 180°.

11. The set of molding elements according to claim 1, wherein the first secondary strip portion and the second secondary strip portion form a single strip.

* * * * *